United States Patent
Fin

(10) Patent No.: US 8,210,096 B2
(45) Date of Patent: Jul. 3, 2012

(54) INFUSION DEVICE FOR PREPARE BEVERAGES FROM SINGLE-SERVING CAPSULES

(75) Inventor: Giuseppe Fin, Meolo Venezia (IT)

(73) Assignee: Koninklijke Philips Electronics N.V., Eindhoven (NL)

(*) Notice: Subject to any disclaimer, the term of this patent is extended or adjusted under 35 U.S.C. 154(b) by 474 days.

(21) Appl. No.: 12/376,173

(22) PCT Filed: Mar. 26, 2007

(86) PCT No.: PCT/EP2007/002636
§ 371 (c)(1),
(2), (4) Date: Oct. 5, 2009

(87) PCT Pub. No.: WO2008/014830
PCT Pub. Date: Feb. 7, 2008

(65) Prior Publication Data
US 2010/0101428 A1    Apr. 29, 2010

(30) Foreign Application Priority Data
Aug. 4, 2006 (IT) ................ FI2006A0194

(51) Int. Cl.
*A47J 31/40* (2006.01)
(52) U.S. Cl. ........................ 99/295; 99/302 P
(58) Field of Classification Search ........... 99/302 P, 99/297, 295, 289 R
See application file for complete search history.

(56) References Cited

U.S. PATENT DOCUMENTS

| 4,389,925 A * | 6/1983 | Piana .................... 99/289 R |
| 5,755,149 A | 5/1998 | Blanc et al. |
| 5,776,527 A | 7/1998 | Blanc |
| 7,562,618 B2 * | 7/2009 | Jarisch et al. ........... 99/289 R |
| 7,703,380 B2 * | 4/2010 | Ryser et al. .............. 99/295 |
| 2009/0249961 A1 * | 10/2009 | Cheng ................... 99/289 R |
| 2009/0293736 A1 * | 12/2009 | Jarisch .................... 99/295 |

FOREIGN PATENT DOCUMENTS

| EP | 1 219 217 B1 | 7/2002 |
| EP | 1 444 932 B1 | 8/2004 |
| EP | 1 495 702 A1 | 1/2005 |
| EP | 1 721 553 A1 | 11/2006 |
| FR | 2 769 483 A1 | 4/1999 |
| WO | WO 2005/004683 | 1/2005 |

* cited by examiner

*Primary Examiner* — Reginald L Alexander

(57) ABSTRACT

A device including a first portion of an infusion chamber and a second portion of an infusion chamber, movable with respect to each other according to an opening and closing direction; a first duct to feed an infusion fluid into said infusion chamber; a second duct for delivery of the food product from the infusion chamber; a pair of guide channels to insert a capsule into a space between the first portion of the infusion chamber and the second portion of the infusion chamber. The guide channels are each produced on a respective movable element; and the movable elements are positioned substantially opposite each other and can be opened to release the capsule into the infusion chamber.

26 Claims, 13 Drawing Sheets

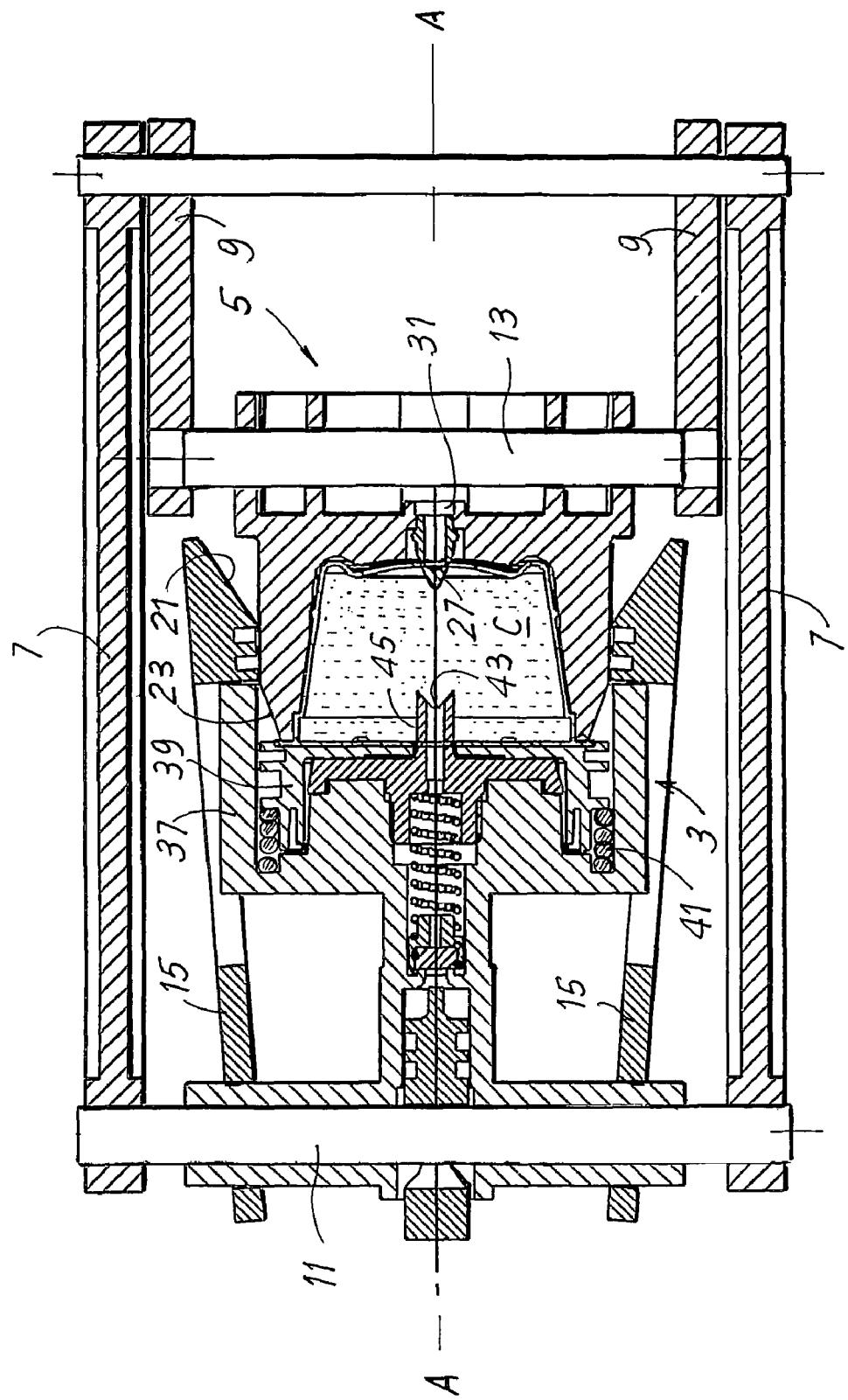

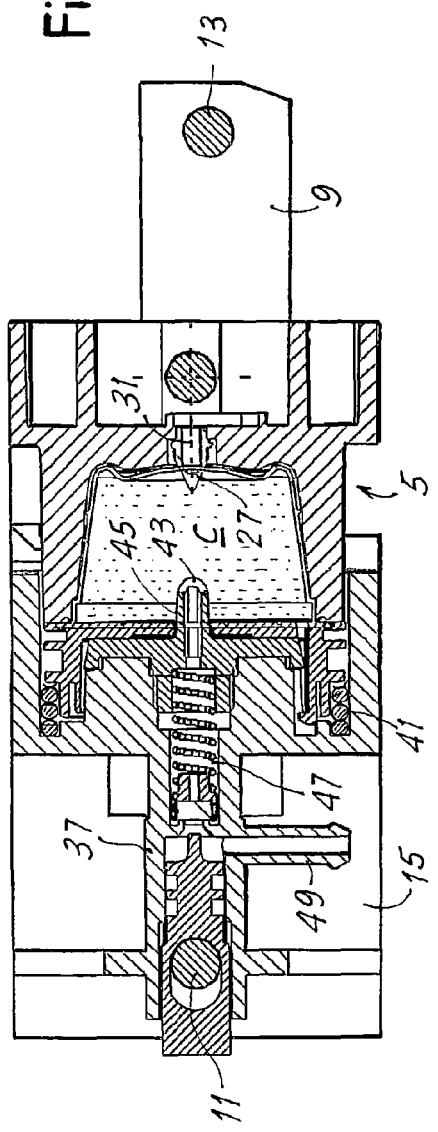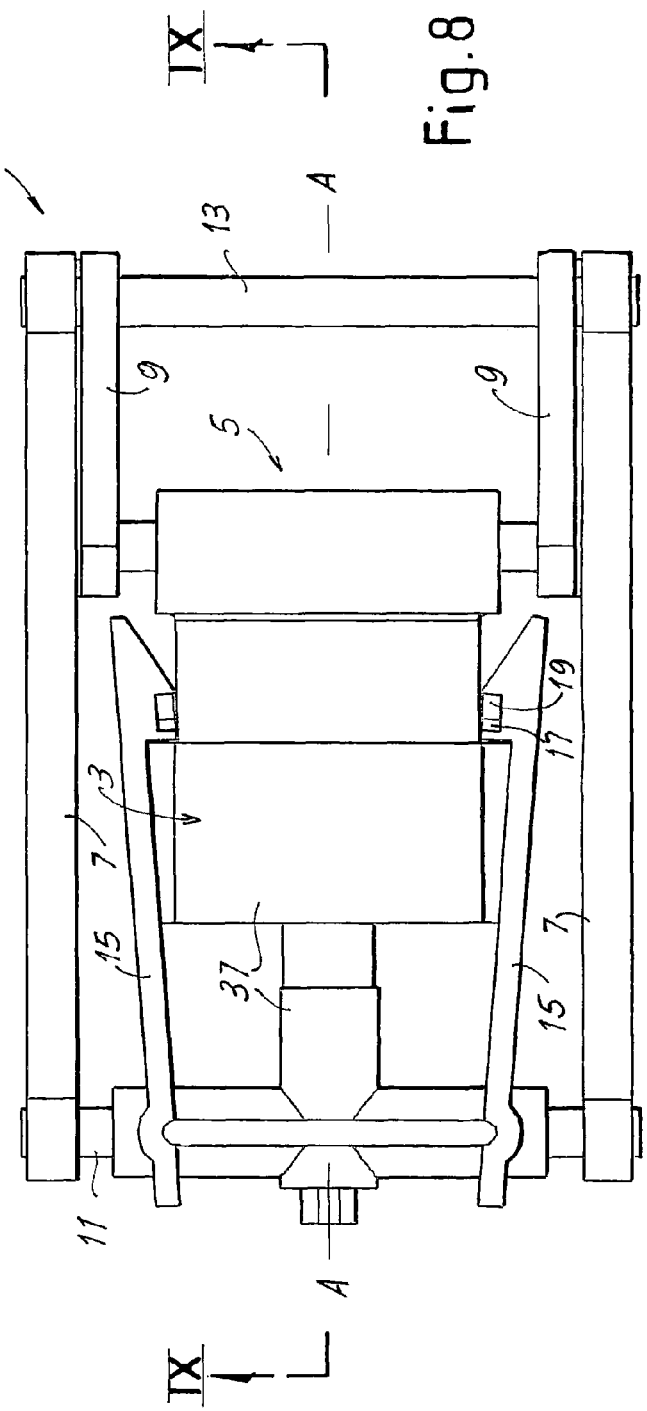

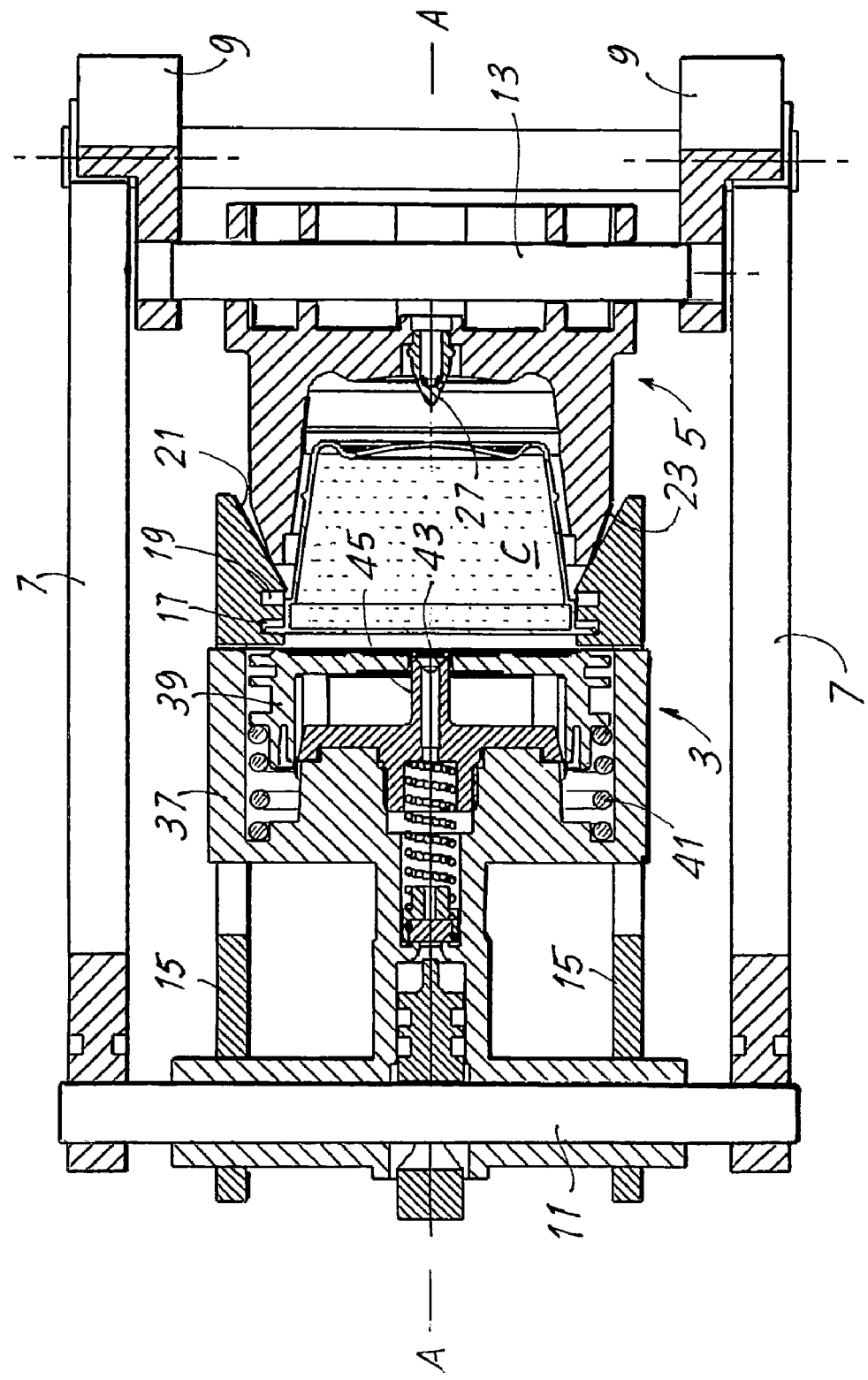

INFUSION DEVICE FOR PREPARE BEVERAGES FROM SINGLE-SERVING CAPSULES

TECHNICAL FIELD

The present invention relates to an infusion device to prepare beverages or other food products from capsules, in particular from single-serving capsules.

More specifically, although not exclusively, the present invention relates to an infusion device to prepare coffee or other hot beverages by extracting or diluting substances contained in single-serving capsules.

PRIOR ART

To prepare hot beverages and other food products, machines are frequently utilized that employ single-serving sachets or capsules containing therewithin the substance that is dissolved in water or from which flavors are extracted using hot water. Machines of this type are usually employed to prepare coffee.

Within the scope of the present description and of the appended claims, capsule is intended as any type of sachet, usually single-serving, suitable for use in this type of machine. The capsules can be sealed, to be perforated with a suitable perforator, or also provided with a pervious, i.e. water permeable, wall, which does not require perforation. Sachets produced, for example, in nonwoven or other permeable material, also known in the art as pods, are also covered by the term capsule.

One of the problems occurring in the production of devices for extracting beverages or other food products from single-serving capsules is represented by the need to position the capsule between two parts or portions of an infusion unit, which must close to retain the capsule therewithin, defining an infusion chamber through which hot water is made to flow and from which the food product is delivered.

EP-A-1444932 describes a device for preparing hot beverages from pods or capsules, provided with an infusion chamber formed of two portions movable with respect to each other through a translational movement. A member is positioned between the two portions of the infusion chamber to temporarily retain the capsules inserted between the open portions of the infusion chamber with a movement substantially orthogonal to the axis of the infusion chamber. This device is particularly complex and therefore costly.

EP-A-1495702 describes a similar infusion device with an infusion chamber in two portions movable with respect to each other in a substantially horizontal direction, parallel to the axis of the infusion chamber. A capsule is inserted between the two portions of the infusion chamber in the open position, dropped by gravity and then held in a temporary position. When the portions defining the infusion chamber are moved towards each other this causes insertion of the capsule in the chamber in the position for infusion and closing of said chamber. The movement to close the two portions of the infusion chamber also causes the capsule to be positioned suitably for unloading after delivery of the beverage.

U.S. Pat. No. 5,755,149 describes an infusion device with two portions defining an infusion chamber, one of which is produced integral with a boiler. The single-serving capsule is inserted using a vertical guide between the two portions, which are movable with respect to each other in a horizontal direction. Inferior supporting means retain the capsule in the correct position to allow closing of the portions defining the infusion chamber.

EP-A-1219217 describes a further infusion device with a chamber formed of two portions movable with respect to each other along a horizontal axis. A vertical guide allows the individual capsules to be loaded by gravity into the open space between the two portions of the infusion chamber. The capsule is housed in a seat which takes a sloped position.

U.S. Pat. No. 5,776,527 describes yet another infusion unit with an infusion chamber in two portions movable with respect to each other in a horizontal direction. When the two portions are spaced apart, a single serving capsule is placed therebetween and is held by two guide and support elements until the two portions of the infusion chamber are closed to perform delivery of the hot water.

OBJECTS AND SUMMARY OF THE INVENTION

An object of the present invention is to provide a new infusion device with an infusion chamber defined by two portions movable with respect to each other and a system to insert the capsules between the two portions of the chamber in the open position, the construction of which is particularly simple and inexpensive.

The object of a particular embodiment of the invention is to obtain an infusion device which is very reliable and simple to perform maintenance on.

According to a first aspect, the invention relates to an infusion device to prepare a food product, in particular a beverage, from capsules, comprising: a first portion of an infusion chamber and a second portion of an infusion chamber, movable with respect to each other according to an opening and closing direction; a first duct to feed an infusion fluid into said infusion chamber; a second duct for delivery of the food product from the infusion chamber; a pair of guide channels to insert a capsule in a space between said first portion of the infusion chamber and said second portion of the infusion chamber, when the first and second portion are in the open position; wherein: the guide channels are each provided on a respective movable element; the movable elements are positioned substantially opposite each other and can be opened to release the capsule into the infusion chamber; and each of said movable elements is provided with an extractor member to engage the capsule and extract it from the infusion chamber after delivery of the food product.

According to an advantageous embodiment of the invention, the first guide channels and the extractor members are positioned sequentially along said opening and closing direction.

In a practical embodiment, the movable elements can have an opening movement in a plane parallel to the direction of the opening and closing movement of the first and of the second portion of the infusion chamber.

In a possible embodiment of the invention, the movable elements are constrained to the first portion of the infusion chamber and the opening movement of said movable elements is controlled by interaction of said movable elements with the second portion of the infusion chamber.

Advantageously, the movable elements can be positioned at the sides of the first portion of the infusion chamber, which translates together therewith in the opening and closing direction.

To cause the movable elements to open and release the capsule during closing of the infusion chamber, the second portion of the infusion chamber can advantageously have thrust profiles, e.g. in the form of opposed surfaces inclined with respect to the direction of the opening and closing movement of the infusion chamber, cooperating with corresponding thrust profiles of the movable elements to cause reciprocal opening of said elements.

In practice, the first guide channels can be associated with a lower stop, which defines a position to retain the capsule in the space between the first portion of the infusion chamber and the second portion of the infusion chamber. The lower stop can be formed by the end of the channel itself, although it would also be possible to provide an external stop, separate from the channel and having, if necessary, its own opening movement controlled in an appropriate way.

Preferably, according to an advantageous embodiment of the invention, the guide channels are arranged and designed so that in the retaining position, before closing of the infusion chamber, the capsule is held with the axis thereof substantially coinciding with the axis of the infusion chamber.

In general, the extractor members can have any suitable form. For example, they can have the form of hooks or catches that engage the flange of the capsule. In an advantageous embodiment of the invention, these extractor members each comprise a respective second guide channel, said second guide channels inferiorly defining an opening for unloading the capsule. The first and the second guide channels are advantageously substantially parallel and positioned side by side with each other along the opening and closing direction of the first and of the second portion of the infusion chamber.

To allow the capsule to be loaded and unloaded simply by gravity, according to a preferred embodiment of the invention the first portion of the infusion chamber and the second portion of the infusion chamber are movable according to a substantially horizontal direction, and the first guide channels are substantially vertical. Preferably, the movable elements are provided with an opening movement in a substantially horizontal plane.

In a possible embodiment of the invention, the second portion of the infusion chamber defines a seat for insertion of the capsule, with an inlet facing the first portion of the infusion chamber, surrounded by a first pressure surface cooperating with a flange of said capsule, and the first portion of the infusion chamber has a second pressure surface opposite the first pressure surface. In closed conditions of the infusion chamber the flange of the capsule is compressed and held between said first and said second pressure surface.

To open and close the infusion chamber a relative movement between the two portions of which it is composed is sufficient. It would be possible for both portions to be provided with a movement with respect to a fixed structure. Preferably, to simplify construction, it is nonetheless advisable for one portion to be fixed and the other movable with respect to a fixed structure. For example, the first portion of the infusion chamber can be movable together with the openable elements that retain the capsule, and the second portion of the infusion chamber can be fixed with respect to a fixed structure.

Opening and closing of the infusion chamber and insertion of the capsule into the guide channels can take place manually or automatically, with the aid of suitable actuators. According to a particularly low cost possible embodiment of the invention, a lever mechanism is provided for manually controlling the opening and closing of the infusion chamber and the capsule can be inserted manually in the guide channels.

The movable and openable elements can be rigid and mounted swiveling with an elastic element that stresses them towards the closed position. Alternatively, the elastic member can stress them towards an open position and an opposing profile can act thereon to cause them to reciprocally move towards each other in the area in which they must retain the capsule. Nonetheless, the openable elements are preferably made to open by thrust profiles produced on one of the two portions of the infusion chamber and according to an advantageous and preferred embodiment are elastically deformable due to the elastic properties of the material with which they are made, e.g. a plastic material, and/or due to their form.

Also forming the object of the present invention is an infusion device to prepare a food product, in particular a beverage, from capsules, comprising: a first portion of an infusion chamber and a second portion of an infusion chamber, movable with respect to each other according to an opening and closing direction; a first duct to feed an infusion fluid into said infusion chamber; a second duct for delivery of the food product from the infusion chamber; a pair of guide elements of the capsule between the first and second portion of the infusion chamber, comprising elements to retain the capsule, deactivatable when said first and said second portion of the infusion chamber close, to release the capsule into said infusion chamber, and extractor elements to extract the capsule from the infusion chamber which activate to engage the capsule when said first and said second portion of the infusion chamber open after delivery of the food product.

Also forming an object of the present invention is a machine to prepare a food product from capsules, in particular a machine to produce coffee, comprising a device as described above.

Further advantageous embodiments of the invention are described hereunder with reference to some illustrative and non-limiting embodiments of the invention and are indicated in the appended claims.

BRIEF DESCRIPTION OF THE DRAWINGS

The invention will be better understood by following the description and accompanying drawing, which shows non-limiting practical embodiments of the invention. More specifically, in the drawing:

FIGS. 6, 7, 8 and 9 show views and sections analogous to the views and sections in FIGS. 1 to 4 respectively, with the infusion unit in the fully closed position;

FIGS. 10 and 11 show longitudinal sections analogous to the sections in FIGS. 2 and 7 in two successive instants of the closing movement of the infusion unit;

DETAILED DESCRIPTION OF EMBODIMENTS OF THE INVENTION

Figure 1:
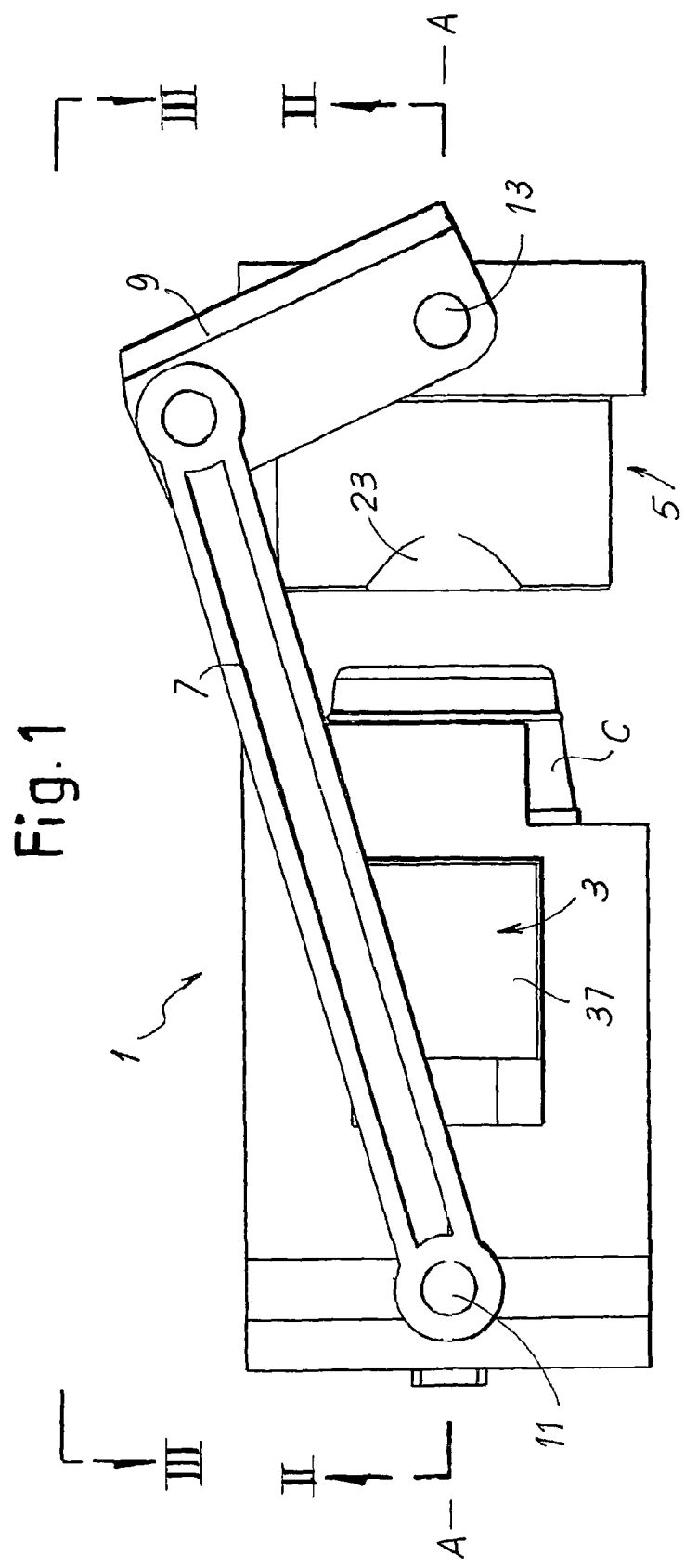
FIG. 1 shows a side view in an open position of the infusion device according to the invention in a first embodiment.

The attached drawing illustrates a device according to the invention limited to the elements required for comprehension of the invention, it being understood that this device can be inserted in a more complex machine, such as a coffee machine provided with further elements known per se and not shown, such as a boiler, a hot water feed pump, a delivery spout for the coffee, etc.

With initial reference to FIGS. 1 to 5, reference numeral 1 indicates generically and as a whole the infusion device, which comprises a first portion 3 and a second portion 5 of an infusion chamber. The two portions 3 and 5 are movable with respect to each other according to a direction substantially parallel to the axis A-A of the infusion chamber. In the example illustrated the axis A-A has a substantially horizontal orientation.

The reciprocal closing and opening movement of the portions 3 and 5 of the infusion chamber is obtained with a lever mechanism 7, 9. The rods 7 of the lever mechanism are hinged by means of a pin 11 to the portion 3 of the infusion chamber, while the elements 9 are hinged by means of a pin 13 to the portion 5 of the infusion chamber.

Associated with the first portion of the infusion chamber is a guide member for the capsules, indicated as a whole with C, which comprises two elements 15 movable with respect to each other with a reciprocal opening movement, as will be explained hereunder with reference to the subsequent figures which show operation of the device. The elements 15 have a flat or laminar extension and are constrained to the pin 11 to which the portion 3 of the infusion chamber is constrained. In proximity to the distal end, i.e. the end farthest away from the pin 11, each of the elements 15 has a first channel 17 and a second channel 19. The shape of the channels 17 and 19 is visible in particular in the sections in FIGS. 5 and 13. As can be seen in particular in FIG. 5, the channels 17 of the two elements 15 forming the guide member have a substantially vertical extension under the axis A-A of the infusion chamber, where the channels 17 terminate with a stop 17A, against which the capsule C inserted in the space between the portions 3, 5 of the infusion chamber rests when said chamber is in the open position (i.e. in the position in FIGS. 1 to 4) to receive a new capsule. Conversely, the channels 19 (see FIG. 13) are open downwardly to allow the capsules C to be unloaded by gravity after infusion, as will be explained in greater detail hereunder. The channels 19 are closed superiorly by a projection that forms a bevel 17B to facilitate entry of the capsule in the adjacent channel 17.

Adjacent to the channels 19 each of the elements 15 has sloping surfaces 21, intended to cooperate with corresponding bevels or sloping surfaces 23 provided on the second portion 5 of the infusion chamber. Orientation of the sloping surfaces 21 and 23 is such that reciprocal movement of the portions 3, 5 of the infusion chamber towards each other during the closing movement thereof causes a reciprocal opening movement of the capsule guiding elements 15. The elasticity of the elements 15 ensures that during opening of the infusion chamber they return to the original position shown in FIGS. 1 to 4, i.e. parallel to each other.

As will be apparent hereunder, the purpose of this opening movement is to release the capsule into the infusion chamber during closing and to extract the capsule after infusion to cause it to be unloaded downwards.

In the example illustrated, the second portion 5 of the infusion chamber defines a seat or compartment 25, substantially in the shape of a truncated cone in the example shown, inside which the capsule C is inserted. Positioned on the base of the compartment 25 is a perforator 27 with a duct or channel 29 for delivery of the coffee or other beverage the capsule C is intended to prepare. The perforator 27 is therefore in connection with the duct 31 for delivery of the beverage, in turn in fluid connection with a delivery spout (not shown).

The inlet of the compartment or seat 25 is surrounded by an annular stop or pressure surface 33. This is shaped and positioned to cooperate with an annular flange F of the capsule C when the infusion chamber formed by the portions 3, 5 is closed. The flange F of the capsule C is pressed against the annular surface 33 by an opposed annular surface 35 provided on the portion 3 of the infusion chamber.

Figure 2:
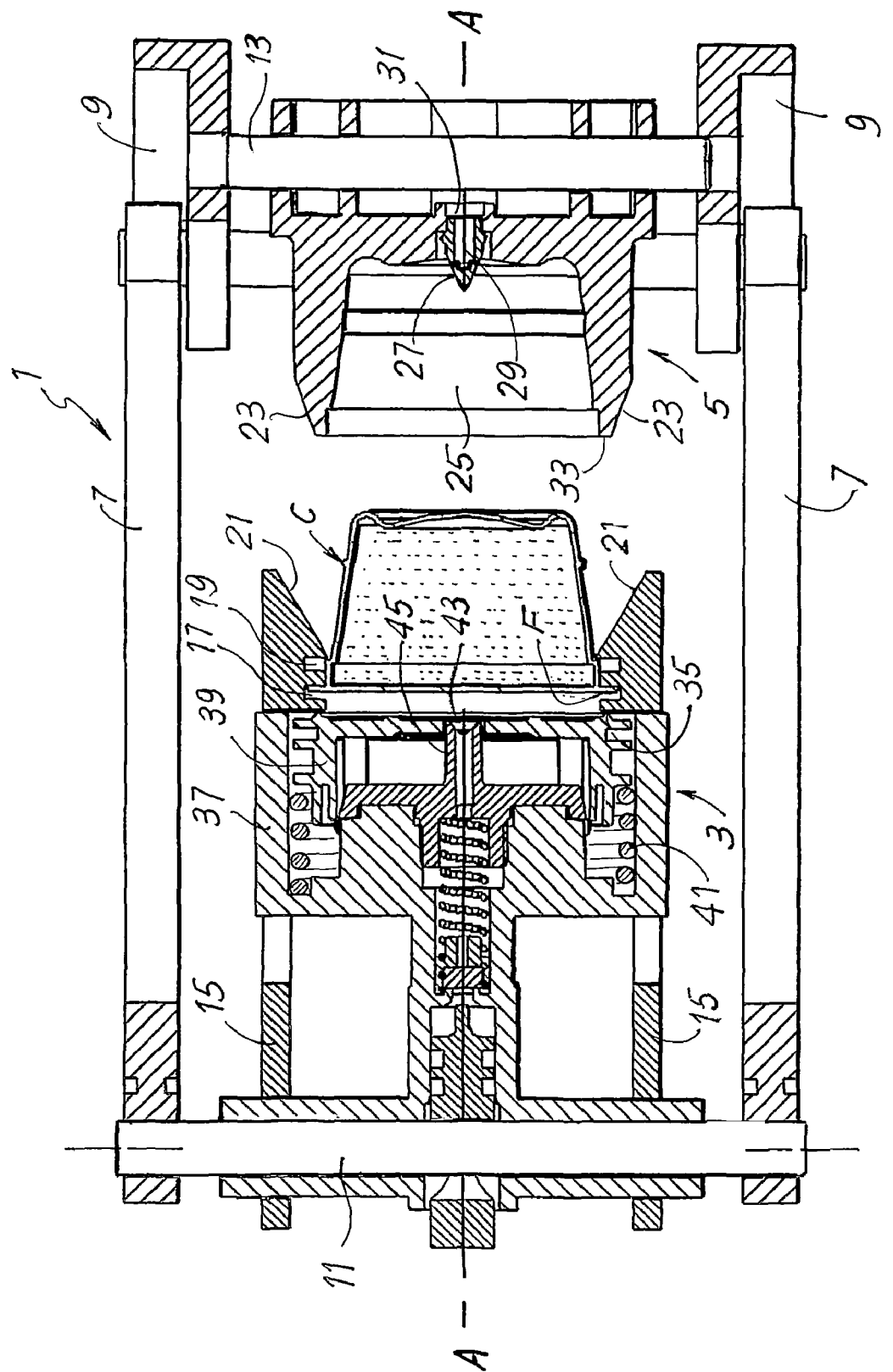
FIG. 2 shows a longitudinal section according to II-II in FIG. 1.
Figure 3:
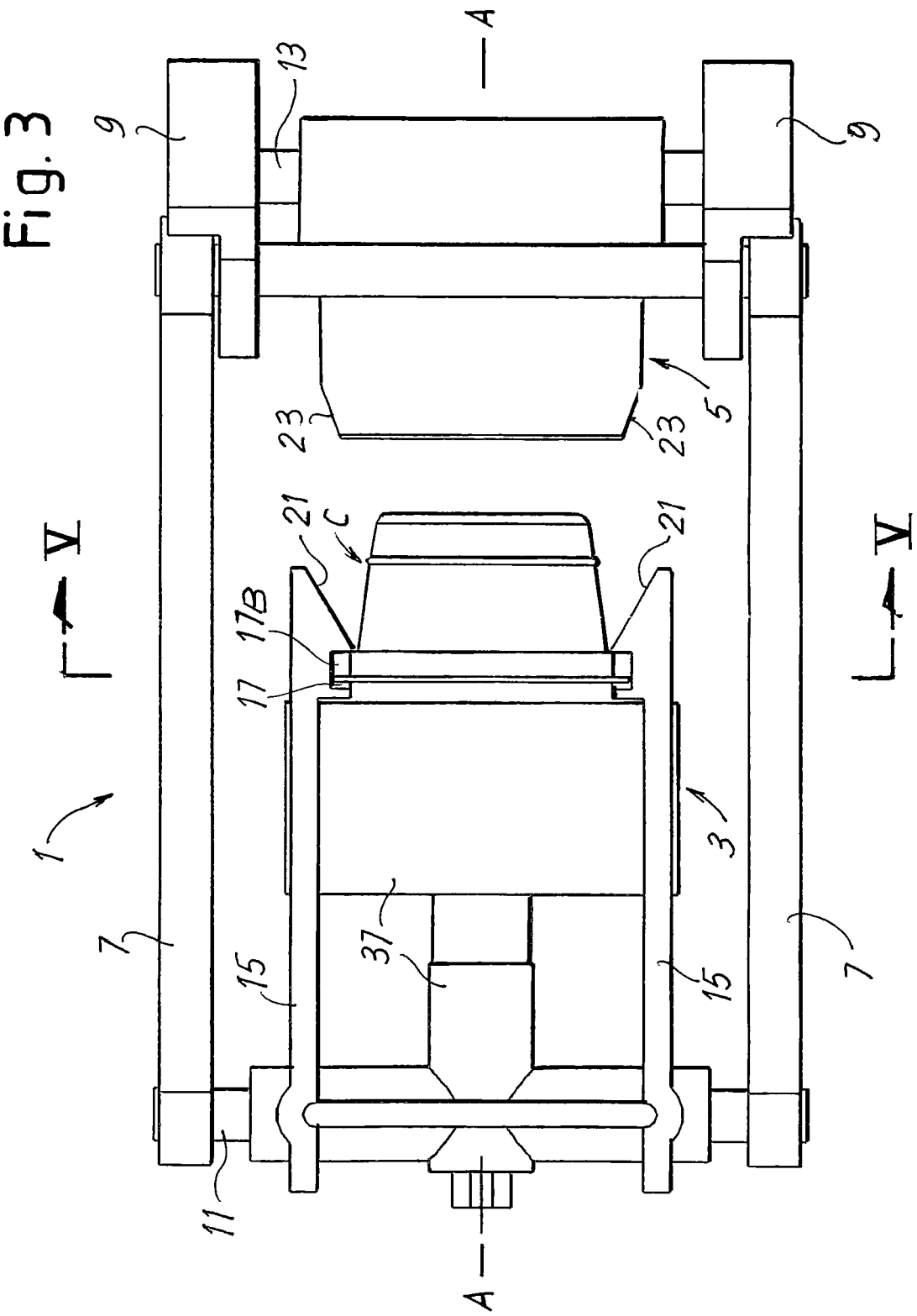
FIG. 3 shows a view according to III-III in FIG. 1.
Figure 4:
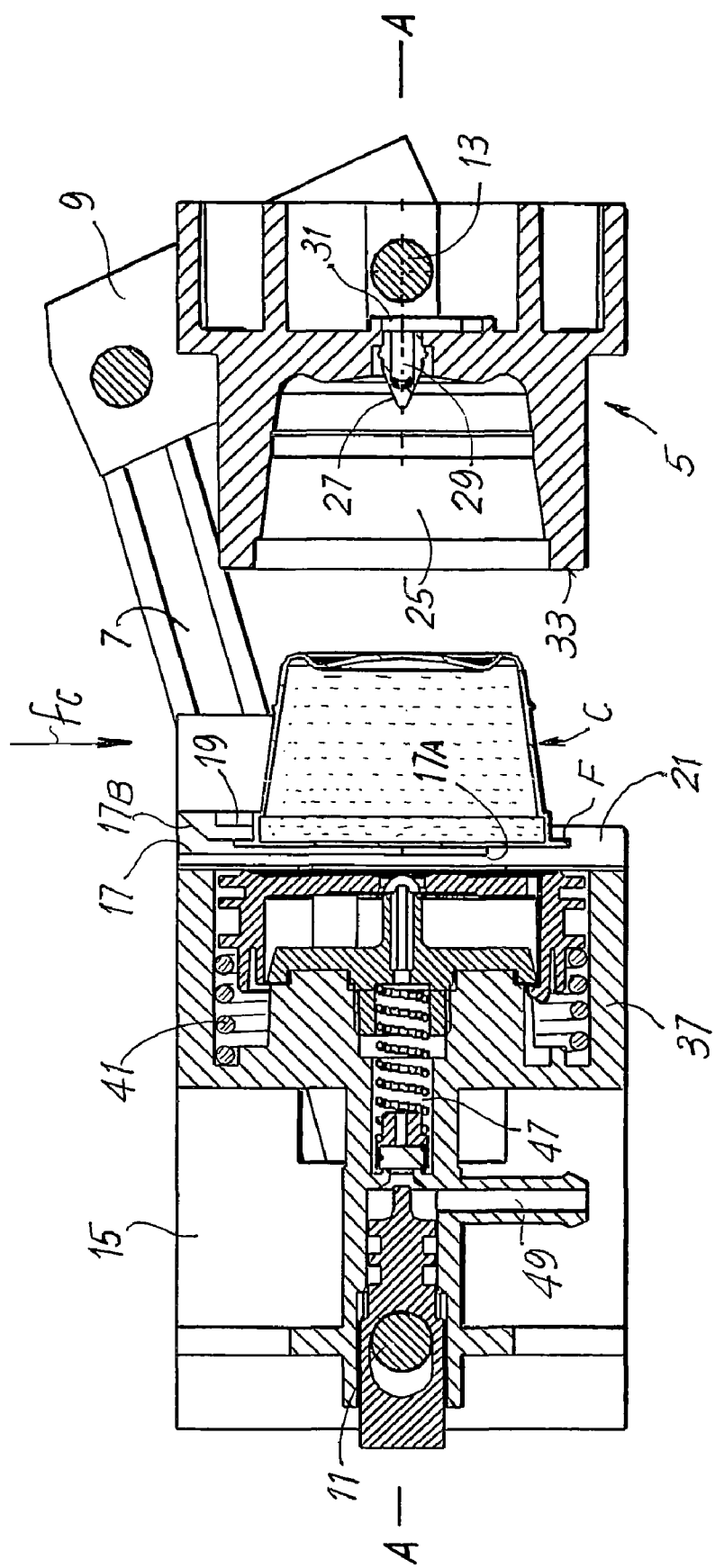
FIG. 4 shows a view according to IV-IV in FIG. 3.
Figure 5:
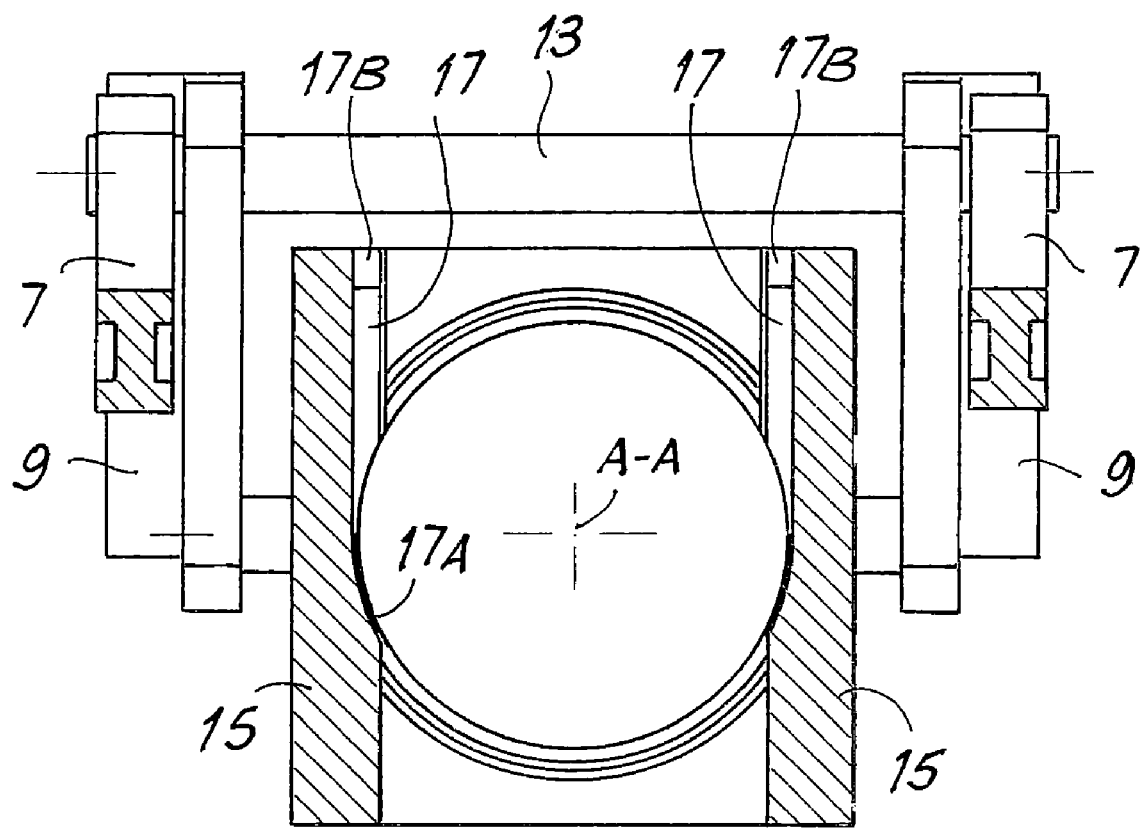
FIG. 5 shows a section according to V-V in FIG. 3.
Figure 6:
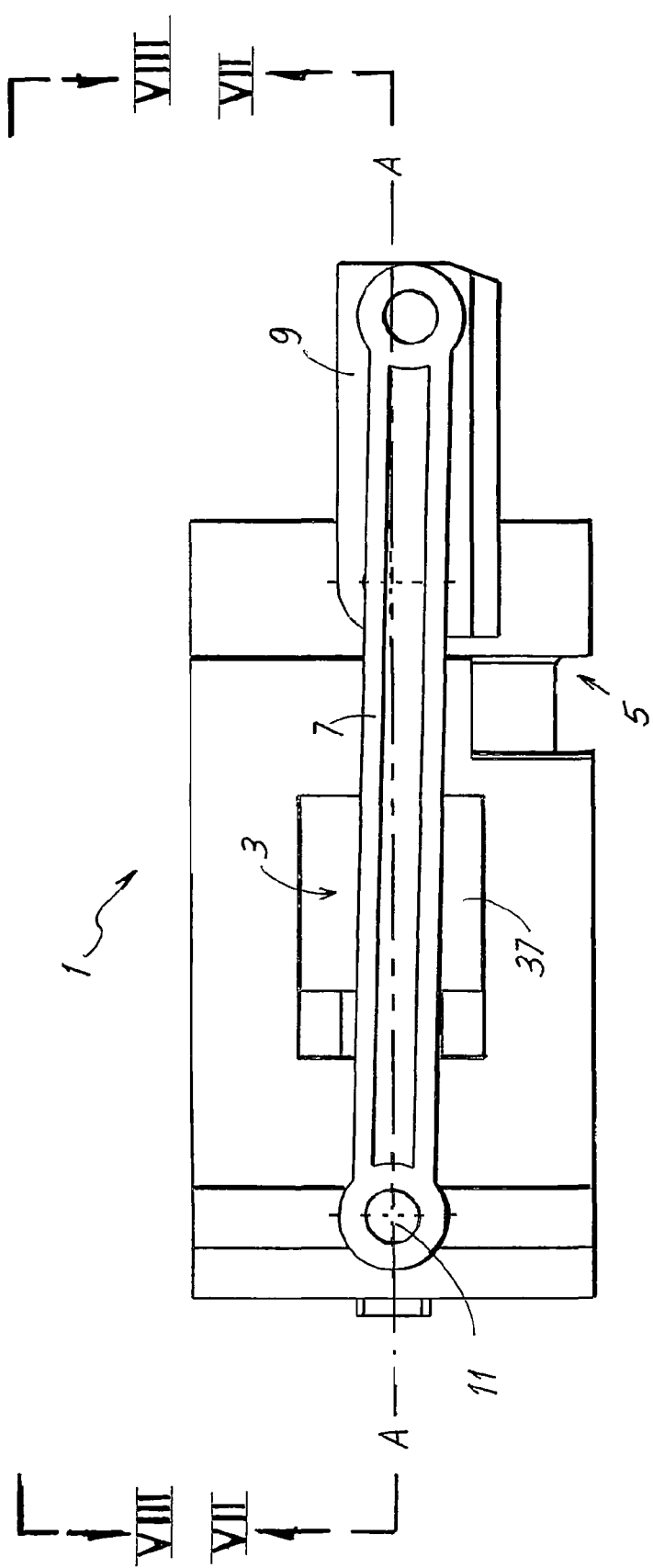

The portion 3 of the infusion chamber substantially has a movable unit 37, housed slidingly inside which is a slider 39 elastically stressed by a spring 41 towards an idle position shown in FIGS. 2 and 4. The slider 39 slides in a direction parallel to the axis A-A of the infusion chamber and has a central hole 43 through which a perforator 45 can project, which is in fluid connection, through a channel 47, with a feed duct 49 of pressurized water delivered from a boiler, not shown.

The device described hereinbefore operates as follows. When a beverage is to be prepared, the capsule C containing the raw material to prepare the beverage, typically coffee, is inserted in the device from above according to the arrow fC (FIG. 4). Insertion can take place manually, automatically or semi-automatically, for example from a magazine or loading device above, not shown. The capsule C is inserted so that the flange F thereof is guided inside the opposing channels 17 provided on the movable elements 15 of the guide member. The bevels 17B facilitate insertion of the capsule.

As the channels 17 have lower stops 17A to halt the capsule, the latter is guided along the channels 17 to take the stand-by position shown in FIGS. 1 to 5. The capsule is positioned with the substantially truncated cone shaped body thereof (in the example illustrated) in front of the seat or compartment 25 of complementary shape produced in the portion 5 of the infusion chamber.

To perform infusion the chamber 3, 5 is closed by reciprocally moving the two portions 3, 5 towards each other. In practice, the portion 5 can be fixed on a load-bearing structure, while the portion 3 is movable by means of the lever mechanism 7, 9.

FIGS. 6 to 9 show, in views and sections equivalent to those in FIGS. 1 to 4, the closed position of the infusion chamber 3, 5. In this position the capsule C is fully inserted in the seat or compartment 25 of the fixed portion 5 of the infusion chamber, and for this purpose the movable elements 15 of the guide member have been opened to release the annular flange F of the capsule C. The capsule is therefore retained by the elements 15 until it has been inserted for part of its axial extension in the seat or compartment 25 and it is then released through reciprocal opening of the two elements 15, in a substantially horizontal plane containing the axis A-A of the infusion chamber, due to thrust exerted by the sloping surfaces 23 on the sloping surfaces 21.

With the movement to close the infusion chamber 3, 5 perforation of the capsules C is also obtained by means of the perforators 27 and 43. More specifically, the perforator 27 perforates the base of the capsule and the perforator 45 perforates the front surface surrounded by the flange F. The perforator 45 is extracted through the hole 43 of the slider 39 during the movement to close the infusion chamber due to compression of the spring 41 caused by the thrust of the capsule that rests with the outer walls thereof against the inner walls of the seat 25.

Figure 11:
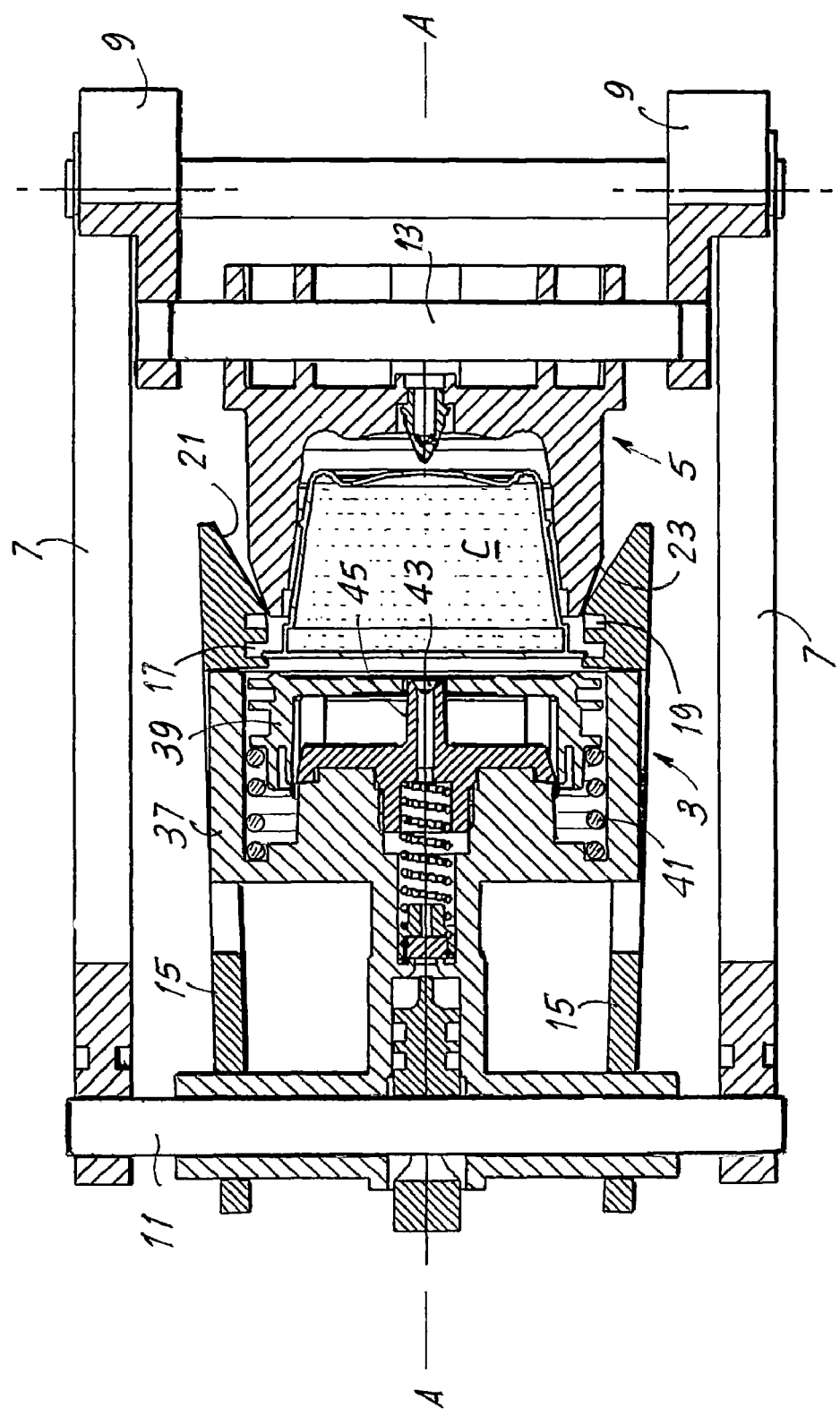

The release mechanism of the capsule C during closing of the infusion chamber can be easily understood by examining the operating sequence illustrated in FIGS. 2, 10, 11 and 7. In FIG. 2, as already mentioned, the infusion chamber is fully open and the capsule C is in the stand-by position with the flange F engaged in the channels 17 of the movable elements 15. By moving the portions 3, 5 of the infusion chamber reciprocally towards each other the sloping surfaces 21 of the movable elements 15 come into contact with the sloping surfaces 23 provided on the outside of the portion 5. The slope is such that the reciprocal movement of the portions 3, 5 towards each other causes the elements 15 to gradually open, as can be seen in FIGS. 10, 11. As the two portions 3, 5 move towards each other, the elements 15 open and release the flange F of the capsule when said capsule has already been engaged with its conical body inside the seat or compartment 25 produced in the portion 5 of the infusion chamber.

Figure 12:
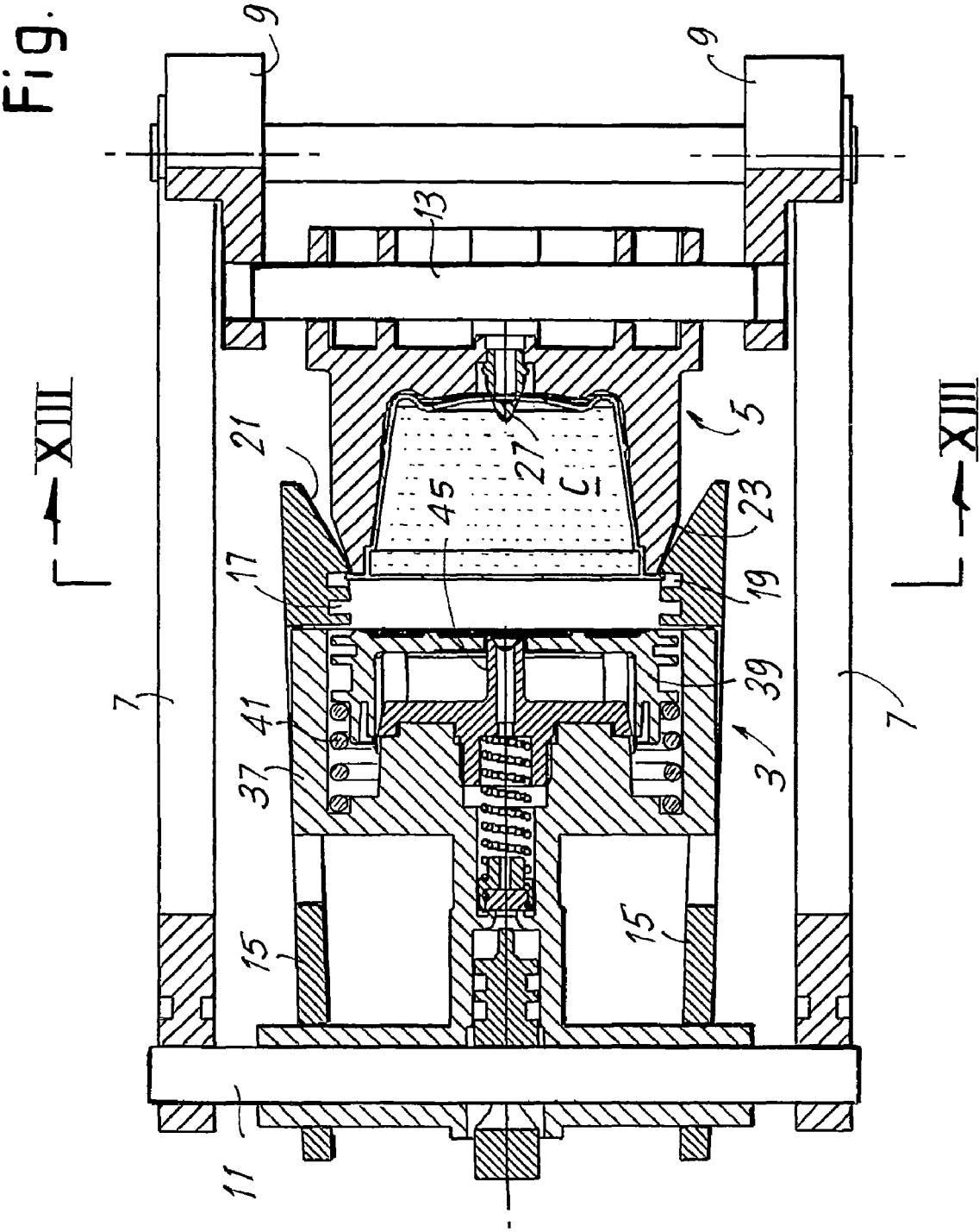
FIG. 12 shows a section analogous to the sections in FIGS. 10 and 11 in a subsequent stage of opening of the infusion unit with engaging of the capsule to extract it from the infusion chamber.

Conversely, FIG. 12 shows what happens when, after delivery of the beverage, the portions 3, 5 of the infusion chamber open again. The slider 39 elastically stressed by the spring 41 pushes the capsule C retaining it inside the seat or compartment 25 while the portion 3 of the infusion chamber moves away from the portion 5. This disengages the capsule C from the perforator 45 which moves back inside the hole 43 of the slider 39. The capsule remains inside the compartment 25, the two portions 3, 5 of the infusion chamber continue to move away from each other and the flange F of the capsule C is engaged by the channels 19 of the movable elements 15 which are located between the channels 17 and the sloping surfaces 21. In substance, the channels 19 act as engaging hooks in two substantially diametrically opposed points of the flange F to extract it from the compartment 25 when the portion 3 of the infusion chamber returns to the position at a maximum distance from the portion 5 (FIG. 2).

Figure 13:
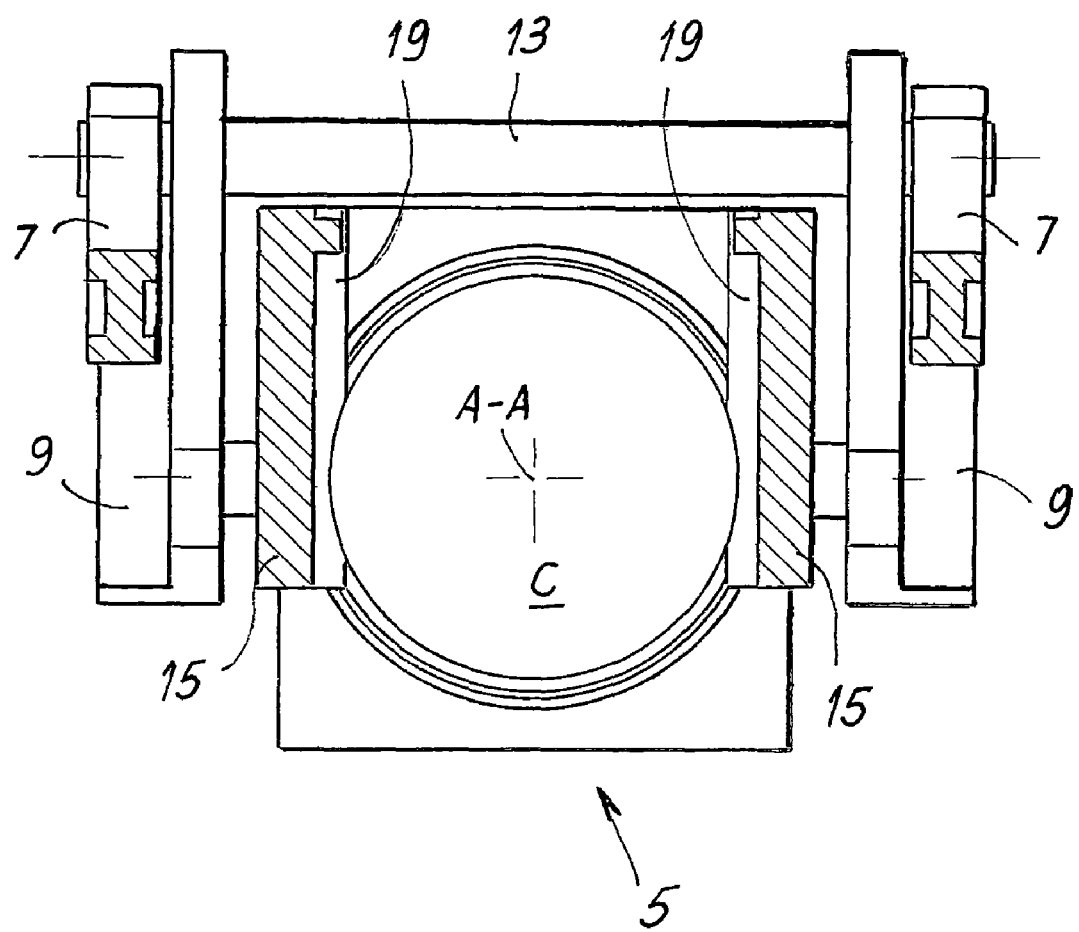
FIG. 13 shows a section according to XIII-XIII of FIG. 12.

As the channels 19 are opened downwards, as shown in FIG. 13, once the capsule C has been completely extracted from the compartment 25, it falls by gravity freeing the device and allowing insertion of a new capsule.

Figure 14:
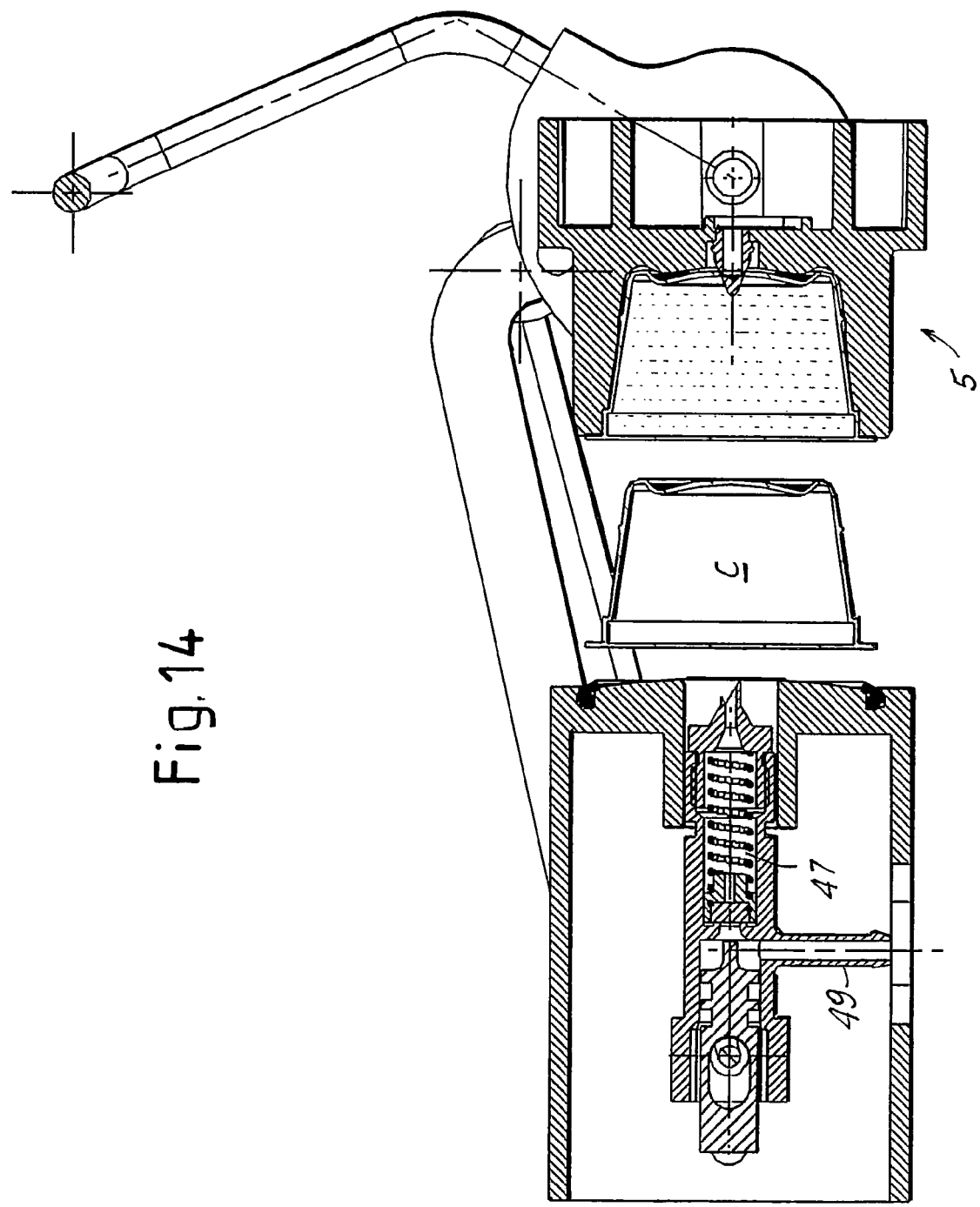
FIG. 14 shows a longitudinal section with parts removed of a modified infusion unit to which the present invention can be applied.

It must be understood that the configuration of the two portions of the infusion chamber, of the perforator means, of the opening and closing devices of the infusion chamber can vary with respect to those illustrated hereinbefore. Purely by way of example, FIG. 14 shows a different embodiment of the portions 3, 5 of the infusion chamber with a different form of the perforator of the front surface of the capsule. In FIG. 14 the channels for guiding and for extracting the capsule are omitted for the sake of simplicity of the drawing, and the capsule is shown in two distinct positions corresponding to the positions of insertion of the capsule with the infusion chamber open and to the capsule inserted in the portion 5 of the infusion chamber. FIG. 14 also shows a modified embodiment of the lever mechanism for closing the infusion chamber.

The concept underlying the invention can also be employed with capsules or pods of other forms, for example which do not require perforation of the walls or of at least one of the two opposed walls, but which are, for example, already pre-perforated or can be perforated due to the pressure of the water delivered in the infusion chamber.

In a modified embodiment the channels 19 can be dispensed with and the extractor member to engage the capsule and extract it from the infusion chamber after delivery of the food product can be formed by the back flat surface of each element 15, which is arranged adjacent to the channel 17.

It is understood that the drawing purely shows an example provided only as a practical arrangement of the invention, which can vary in forms and arrangement without however departing from the scope of the concept underlying the invention. Any reference numerals in the appended claims are provided to facilitate reading of the claims with reference to the description and to the drawing, and do not limit the scope of protection represented by the claims.

The invention claimed is:

1. An infusion device to prepare a food product, in particular a beverage, from capsules, the device comprising:
    a first portion of an infusion chamber and a second portion of the infusion chamber, movable apart with respect to each other according to an opening and closing direction;
    a first duct to feed an infusion fluid into the infusion chamber;
    a second duct for delivery of the food product from the infusion chamber;
    a pair of first guide channels configured to receive a flange of a capsule during insertion of the capsule in a space between the first and second portions of the infusion chamber when the first and second portions are in the open position, wherein the first guide channels are each provided on a respective movable element, the movable elements being positioned substantially opposite each other and can be opened to release the capsule into the infusion chamber, each of the movable elements being provided with an extractor member to engage the capsule and extract the capsule from the infusion chamber when the first and second portions of the infusion chamber open, wherein the device is configured to move the flange past the first guide channels when the first and second portions of the infusion chamber move in the opening direction.

2. The device as claimed in claim 1, wherein each one of the first guide channels and a respective one of the extractor members are positioned on the respective movable element sequentially along the opening and closing direction, wherein the device is configured to initially move the flange towards the first guide channels when the first and second portions begin movement in the opening direction.

3. The device as claimed in claim 1, wherein the movable elements have an opening movement in a plane parallel to the direction of the opening and closing movement of the first and second portions of the infusion chamber.

4. The device as claimed in claim 1, wherein:
    the movable elements are constrained to the first portion of the infusion chamber; and
    the opening movement of the movable elements is controlled by interaction of the movable elements with the second portion of the infusion chamber.

5. The device as claimed in claim 4, wherein the movable elements are positioned at the sides of the first portion of the infusion chamber.

6. The device as claimed in claim 4, wherein the second portion of the infusion chamber has first thrust profiles cooperating with corresponding second thrust profiles of the movable elements to cause reciprocal opening of the movable elements.

7. The device as claimed in claim 6, wherein the second portion of the infusion chamber has opposed outer sloping surfaces, inclined with respect to the direction of opening and closing of the infusion chamber, forming the first thrust profiles.

8. The device as claimed in claim 6, wherein the second thrust profiles of the movable elements are formed by sloping surfaces, which are inclined with respect to the direction of opening and closing of the infusion chamber.

9. The device as claimed in claim 1, wherein the first guide channels are associated with a lower stop which defines a capsule retention position in the space between the first and second portions of the infusion chamber.

10. The device as claimed in claim 1, wherein each of the first guide channels terminates with a lower stop, the stops defining a position to retain the capsule in the space between the first and second portions of the infusion chamber.

11. The device as claimed in claim 9, wherein the first guide channels are positioned and configured so that in the retaining position the capsule is held with the axis thereof substantially coinciding with the axis of the infusion chamber.

12. The device as claimed in claim 1, wherein each of the extractor members comprises a respective second guide channel, the second guide channels inferiorly defining an opening for unloading the capsule, the first and second guide channels being substantially parallel and positioned side by side with each other along the opening and closing direction of the first and second portions of the infusion chamber.

13. The device as claimed in claim 12, wherein surfaces to facilitate insertion of the flange of the capsule in the first channels are positioned over the second channels.

14. The device as claimed in claim 1, wherein the first and said second portions of the infusion chamber are movable with respect to one another according to a substantially horizontal direction, the first guide channels being substantially vertical and the movable elements being provided with an opening movement in a substantially horizontal plane.

15. The device as claimed in claim 1, wherein the second portion of the infusion chamber defines a seat for insertion of the capsule, with an inlet facing the first portion of the infusion chamber, surrounded by a first pressure surface cooperating with the flange of said capsule, the first portion of the infusion chamber having a second pressure surface opposite the first pressure surface, wherein when the device is in a closed position the flange of the capsule is compressed and held between the first and said second pressure surfaces.

16. The device as claimed in claim 1, wherein the first portion of the infusion chamber is movable and the second portion of the infusion chamber is fixed with respect to a load-bearing structure, the movable elements moving along with the first portion of the infusion chamber in the opening and closing direction.

17. The device as claimed in claim 1, further comprising a lever mechanism for manual control of opening and closing of the infusion chamber.

18. The device as claimed in claim 17, wherein the first portion of the infusion chamber and the movable elements are constrained to a common support.

19. The device as claimed in claim 1, wherein the movable elements are elastically deformable.

20. The device as claimed in claim 1, wherein the movable elements are substantially laminar in shape.

21. The device as claimed in claim 1, wherein each extractor member is integral to the respective movable element, and wherein the extractor members activate to engage the capsule when the first and second portions of the infusion chamber open.

22. The device as claimed in claim 21, wherein the movable elements are elastically openable to cause release of the capsule during closing of the infusion chamber and to engage the capsule by the extractor members during opening of the infusion chamber.

23. The device as claimed in claim 1, wherein the movable elements are constrained to one of the first and second portions of the infusion chamber and cooperate with opposing surfaces integral with another of the first and second portions of the infusion chamber to cause opening of the movable elements and release of the capsule during closing of the infusion chamber.

24. A machine to prepare a food product from capsules, the machine comprising:
 a device including:
  a first portion of an infusion chamber and a second portion of an infusion chamber, movable with respect to each other according to an opening and closing direction;
  a first duct to feed an infusion fluid into the infusion chamber;
  a second duct for delivery of the food product from the infusion chamber;
  a pair of guide channels configured to receive a flange of a capsule during insertion of the capsule in a space between the first and second portions of the infusion chamber, when the first and second portions are in the open position, wherein the guide channels are each provided on a respective movable element, the movable elements being positioned substantially opposite each other and can be opened to release the capsule into the infusion chamber, each of the movable elements being provided with an extractor member to engage the capsule and extract the capsule from the infusion chamber when the first and second portions of the infusion chamber open, wherein the device is configured to move the flange past the first guide channels when the first and second portions of the infusion chamber move in the opening direction.

25. An infusion device to prepare a food product, in particular a beverage, from capsules, the device comprising:
 a first portion of an infusion chamber and a second portion of an infusion chamber, movable with respect to each other according to an opening and closing direction;
 a first duct to feed an infusion fluid into the infusion chamber;
 a second duct for delivery of the food product from the infusion chamber;
 a pair of first guide channels to insert a capsule in a space between the first and second portions of the infusion chamber when the first and second portions of the infusion chamber are in the open position, wherein the guide channels are each provided on a respective movable element, the movable elements being positioned substantially opposite each other and can be opened to release the capsule into the infusion chamber, each of the movable elements being provided with an extractor member to engage the capsule and extract the capsule from the infusion chamber when the first and second portions of the infusion chamber open, wherein each of the extractor members comprises a respective second guide channel, the second guide channels inferiorly defining an opening for unloading the capsule, the first and second guide channels being substantially parallel and positioned side by side with each other along the opening and closing direction of the first and second portions of the infusion chamber.

26. The device as claimed in claim 25, wherein surfaces to facilitate insertion of a flange of the capsule in the first channels are positioned over the second channels.

* * * * *